US005315476A

United States Patent [19]

Hedrick, Paul A.

[11] Patent Number: 5,315,476

[45] Date of Patent: May 24, 1994

[54] MALE CONDUCTOR PLUG FOR A CORD SET

[75] Inventor: Hedrick, Paul A., West Greenwich, R.I.

[73] Assignee: General Cable Industries, Inc., Highland Heights, Ky.

[21] Appl. No.: 21,320

[22] Filed: Feb. 23, 1993

[51] Int. Cl.[5] .......... H02B 1/20

[52] U.S. Cl. .......... 361/652; 200/302.2; 200/51 R; 361/730; 361/826; 439/620

[58] Field of Search .......... 200/51 R, 302.2; 361/380, 376, 392, 394, 395, 428; 439/620–622

[56] References Cited

U.S. PATENT DOCUMENTS

| | | | |
|---|---|---|---|
| 2,125,126 | 7/1938 | Rivers . | |
| 2,508,637 | 5/1950 | Bolesky . | |
| 3,825,875 | 7/1974 | Garrett | 200/51 R |
| 4,167,658 | 9/1979 | Sherman | 200/51 R |
| 4,443,050 | 4/1984 | Taylor | 439/620 |
| 4,567,544 | 1/1986 | Ronemus et al. | 361/394 |
| 4,679,877 | 7/1987 | Ahroni | 439/620 |
| 4,903,162 | 2/1990 | Kopelman . | |
| 5,167,535 | 12/1992 | Kovacik et al. | 439/620 |

FOREIGN PATENT DOCUMENTS

| | | | |
|---|---|---|---|
| 479027 | 3/1953 | Italy | 200/51 R |
| 620566 | 5/1961 | Italy | 200/51 R |

*Primary Examiner*—Gregory D. Thompson

*Attorney, Agent, or Firm*—Salter, Michaelson & Benson

[57] ABSTRACT

A male conductor plug for a cord set includes a bi-metallic circuit breaker. The positive, neutral and ground blades extend outwardly from the front end of the plug housing and the reset switch of the circuit breaker extends outwardly from the rear end of the housing. A circular wall extends outwardly from the rear of the housing to form a socket-like enclosure around the reset switch and a flexible water resistant boot is received over the reset switch and inside the wall to prevent the introduction of moisture into the circuit breaker.

5 Claims, 1 Drawing Sheet

MALE CONDUCTOR PLUG FOR A CORD SET

BACKGROUND OF THE INVENTION

The instant invention relates to an electrical cord set and more particularly to a cord set having a circuit breaker combined with the male conductor plug thereof.

Circuit breaking devices for conductor plugs have heretofore been known in the art. In this regard, the Rivers U.S. Pat. No. 2,125,126; Bolesky U.S. Pat. No. 2,508,637; and Kopelman U.S. Pat. No. 4,903,162 represent the closest prior art to the instant invention of which the applicant is aware.

The Rivers patent discloses a male conductor plug for an extension cord set. The conductor plug includes a circuit breaking device which interrupts the plug circuit at a predetermined flow of current. The plug includes a reset button for resetting the breaker after it has been tripped.

The patent to Bolesky discloses another male conductor plug having a circuit breaking device incorporated therein. The circuit breaking device employs a bi-metallic switch which is responsive to excess heat produced by current overloads in the circuit. The bi-metallic switch includes reset means for resetting the switch after actuation.

The patent to Kopelman discloses yet another conductor plug having a fire prevention device combined therewith. One of the conductor plug blades is connected in series with a heat sensitive switch and a time delay switch. The heat sensitive switch is responsive to excessive heat build up in the circuit due to increased current or due to an outside heat source. The heat sensitive switch automatically resets itself, however the time delay circuit is operative to delay re-establishing the electrical circuit for a predetermined time after the circuit has been broken for any reason.

SUMMARY OF THE INVENTION

The instant invention provides a male conductor plug having a bi-metallic circuit breaking device incorporated therein.

Briefly, the cord set includes positive, neutral, and ground lead wires, and the male conductor plug comprises a neutral blade attached to the neutral lead wire, a ground blade connected to the ground lead wire, a positive blade, and a bi-metallic circuit breaker device having an input terminal, an output terminal, and a reset switch. The positive lead wire of the cord set is connected to the output terminal of the circuit breaker, and the positive blade is connected to the input terminal. A molded housing encapsulates the blades, circuit breaker and cord set so that the blades extend outwardly from a front wall thereof, and the reset switch extends outwardly from a rear wall thereof. A circular ridge extends outwardly from the rear wall of the housing to form a socket-like enclosure around the reset switch. A flexible water resistant boot is received over the reset switch and inside the ridge to prevent the introduction of moisture into the circuit breaker.

Accordingly it is an object of the instant invention to provide a male conductor plug for a cord set.

It is another object to provide a circuit breaking device for a male conductor plug.

It is yet another object to provide a male conductor plug having a circuit breaking device and a reset switch for resetting the circuit breaking device.

It is still another object to provide a socket-like enclosure and a flexible boot for the reset switch which cooperate to prevent the introduction of moisture into the circuit breaking device.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
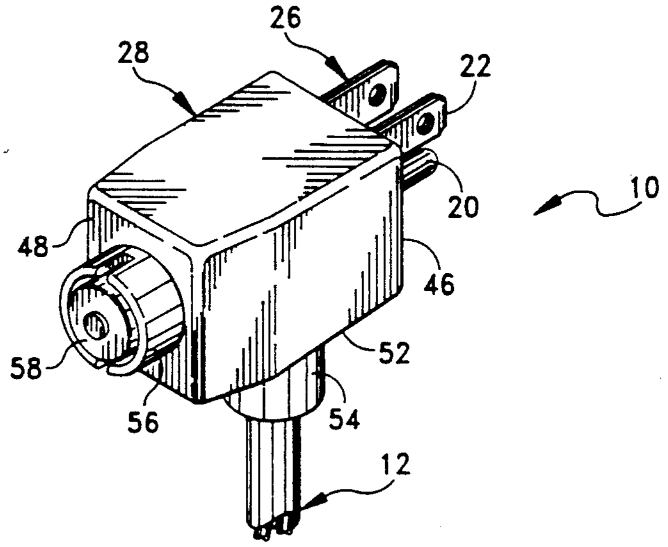
FIG. 1 is a perspective view of the male conductor plug of the instant invention.
Figure 2:
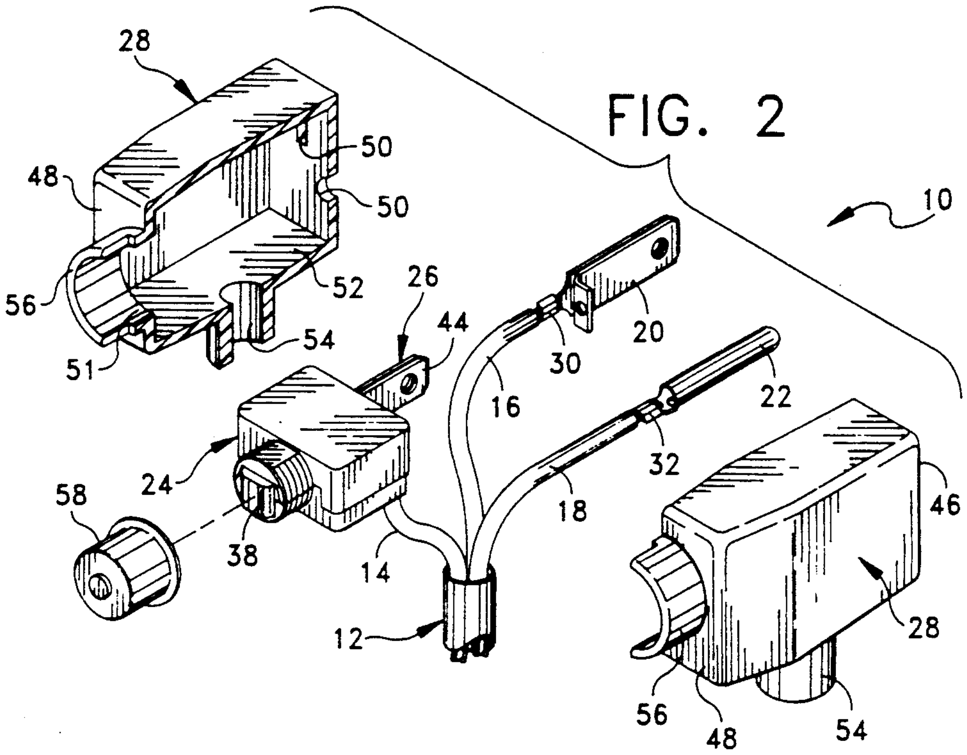
FIG. 2 is an exploded perspective view thereof.

Referring now to the drawings, the male conductor plug of the instant invention is illustrated and generally indicated at 10 in FIGS. 1 and 2. The male conductor plug 10 is preferably located at one end of a cord set generally indicated at 12, and it is operative for insertion into an electrical outlet to provide electric current to the cord set. The cord set 12 may comprise a cord set for an appliance, such as a hair dryer, or it may comprise an extension cord set. The cord set 12 comprises a positive lead wire 14, a neutral lead wire 16, and a ground lead wire 18. The male conductor plug 10 comprises a neutral blade 20, a ground blade 22, a circuit breaker device generally indicated at 24, a positive blade generally indicated at 26, and a molded housing generally indicated at 28.

The neutral blade 20 is fashioned in a conventional manner, and it includes a flat head portion which is effective for insertion into a neutral receptacle in an electrical outlet. The neutral blade 20 is connected to the neutral lead wire 16 of the cord set 12 by means of a conventional type crimp connector 30.

The ground blade 22 is also fashioned in a conventional manner, and it includes a rounded head portion which is effective for insertion into a ground receptacle in an electrical outlet. The ground blade 22 is connected to the ground lead wire 18 of the cord set 12 by means of a conventional type crimp connector 32.

The circuit breaker device 24 preferably comprises a KLIXON brand (Registered trademark of Texas Instruments, Inc.) circuit breaker which is the subject of U.S. Pat. No. 3,288,967. The KLIXON circuit breaker 24 is a bi-metallic type circuit breaker which is effective for interrupting an electrical circuit when overloaded with excessive electrical current. The circuit breaker 24 thereby prevents the cord set 12 or appliance connected series therewith from damage to due the electrical overload. The circuit breaker 24 includes an input terminal 34, an output terminal 36, and a reset switch 38 which is effective for resetting the circuit breaker 24 after an overload has tripped the circuit breaker switch. The output terminal 36 of the circuit breaker 24 includes a crimp connector 40, and the positive lead wire 14 of the cord set 12 is connected to the crimp connector 40.

Figure 3:
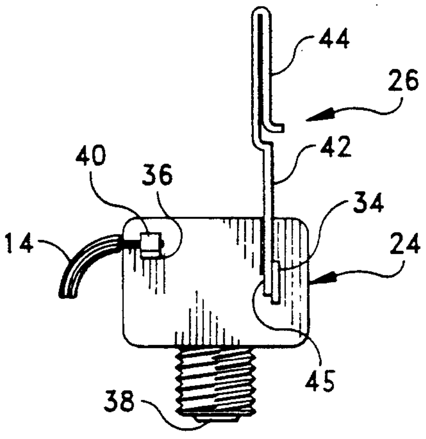
FIG. 3 is an elevational view of the circuit breaking device thereof with the positive lead wire and the positive blade attached thereto.

The positive blade 26 is custom fashioned to include an elongated body portion 42 (FIG. 3), and a conventional flat head portion 44 which is effective for insertion into a positive receptacle in an electrical outlet. A terminal end 45 of the elongated body portion 42 is attached in any suitable manner, such as by soldering or welding, to the input terminal 34 of the circuit breaker 24 to form a combined blade/circuit breaker unit.

The housing 28 preferably comprises a rigid, molded plastic which is formed to encapsulate the cord set 12, the blades 20, 22 and 26, and the circuit breaker device 24. The housing 28 is preferably molded in a right angle configuration, and it includes opposite front and rear walls 46 and 48 respectively, a plurality of apertures 50 in the front wall 46, an aperture in the rear wall, 51, a bottom wall 52, and a tubular projection 54 extending outwardly from the bottom wall 52. The blades 20, 22 and 26 extend outwardly through the apertures 50 in the front wall 46 of the housing 28, the cord set 12 extends outwardly through the tubular projection 54 on the bottom wall 52 of the housing 28, and the reset switch 38 extends outwardly through the aperture 11 in the rear wall 48 of the housing 28. The housing 28 further includes a circular ridge 56 which extends outwardly from the rear wall 48 to form a socket-like enclosure around the reset switch 38. The housing 28 also comprises a flexible, water resistant boot 58 which is received over the reset switch 38 and inside the ridge 56 in order to prevent the introduction of moisture into the circuit breaker 24. The housing 28 therefore provides a water resistant enclosure which effectively prevents the introduction of moisture into the circuit connections and the circuit breaker 24. The flexible boot 58 enables an operator to easily depress the reset switch 38 enclosed therein in the event of a circuit interruption. The circular ridge 56 also prevents the reset switch 38 from accidentally being depressed by unintentional contact with the rear end of the connector plug 10.

It can therefore be seen that the instant invention provides a conductor plug 10 which is effective for use in wet or moist areas, such as in bathrooms and outdoors areas, where the introduction of moisture into to the plug connections or circuit breaker 24 could present a potential hazard to human life. The socket-like enclosure 56 on the housing 28 and the water resistant boot 58 cooperate to provide a water resistant seal which effectively prevents the introduction of moisture into the circuit breaker 24 thereby ensuring defect free operation of the circuit breaking device 24 in the event of an overload situation. For these reasons, the male conductor plug 10 of the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A right angle male conductor plug and cord set, said cord set having a positive lead wire, a neutral lead wire and a ground lead wire, said conductor plug comprising:

a neutral blade connected to said neutral lead wire;

a ground blade connected to said ground lead wire;

a circuit breaking device having an input terminal, an output terminal, and a reset switch, said positive lead wire being connected to said output terminal, said circuit breaker further including an integral positive blade having a head portion for insertion into an electrical outlet and an elongated body which is fixedly mounted to said input terminal of said circuit breaking device, a molded housing having opposite first and second walls, said housing encapsulating said circuit breaker and blade combination, and said cord set wherein said head portion of said positive blade, said neutral blade, and said ground blade extend outwardly from the first wall of said housing and said reset switch extends outwardly from the opposite second wall of said housing, said cord set extending outwardly and downwardly from said housing through a bottom wall thereof.

2. A right angle male conductor plug and cord set, said cord set having a positive lead wire, a neutral lead wire and a ground lead wire, said conductor plug comprising:

a neutral blade connected to said neutral lead wire;

a ground blade connected to said ground lead wire;

a circuit breaking device having an input terminal, an output terminal, and a reset switch, said positive lead wire being connected to said output terminal;

a positive blade having a head portion for insertion into an electrical outlet, and an elongated body which is connected to said input terminal of said circuit breaking device;

a molded housing having opposite first and second walls, said housing encapsulating said circuit breaker and blade combination, and said cord set wherein said head portion of said positive blade, said neutral blade and said ground blade extend outwardly from the first wall of said housing and said reset switch extends outwardly from the opposite second wall of said housing, said housing further including a substantially circular ridge which extends outwardly from said second wall so as to substantially surround said reset switch of said circuit breaker; and a cylindrical, cup shaped flexible boot having a terminal flange at an open end thereof, said boot being received over said reset switch so that said terminal flange is received inside said ridge adjacent said second wall, said boot cooperating with said ridge for preventing the introduction of moisture into said circuit breaking means, said cord set extending outwardly and downwardly from said housing through a bottom wall thereof.

3. In the conductor plug and cord set of claim 2, said elongated body of said positive blade being fixedly mounted to said input terminal so as to form an integral combination of said circuit breaking device and said positive blade.

4. In the conductor plug and cord set of claim 2, said ridge having a height which is substantially equal to a height of said reset switch.

5. In the conductor plug and cord set of claim 4, said circular ridge including at least one slit therein.

* * * * *